UNITED STATES PATENT OFFICE.

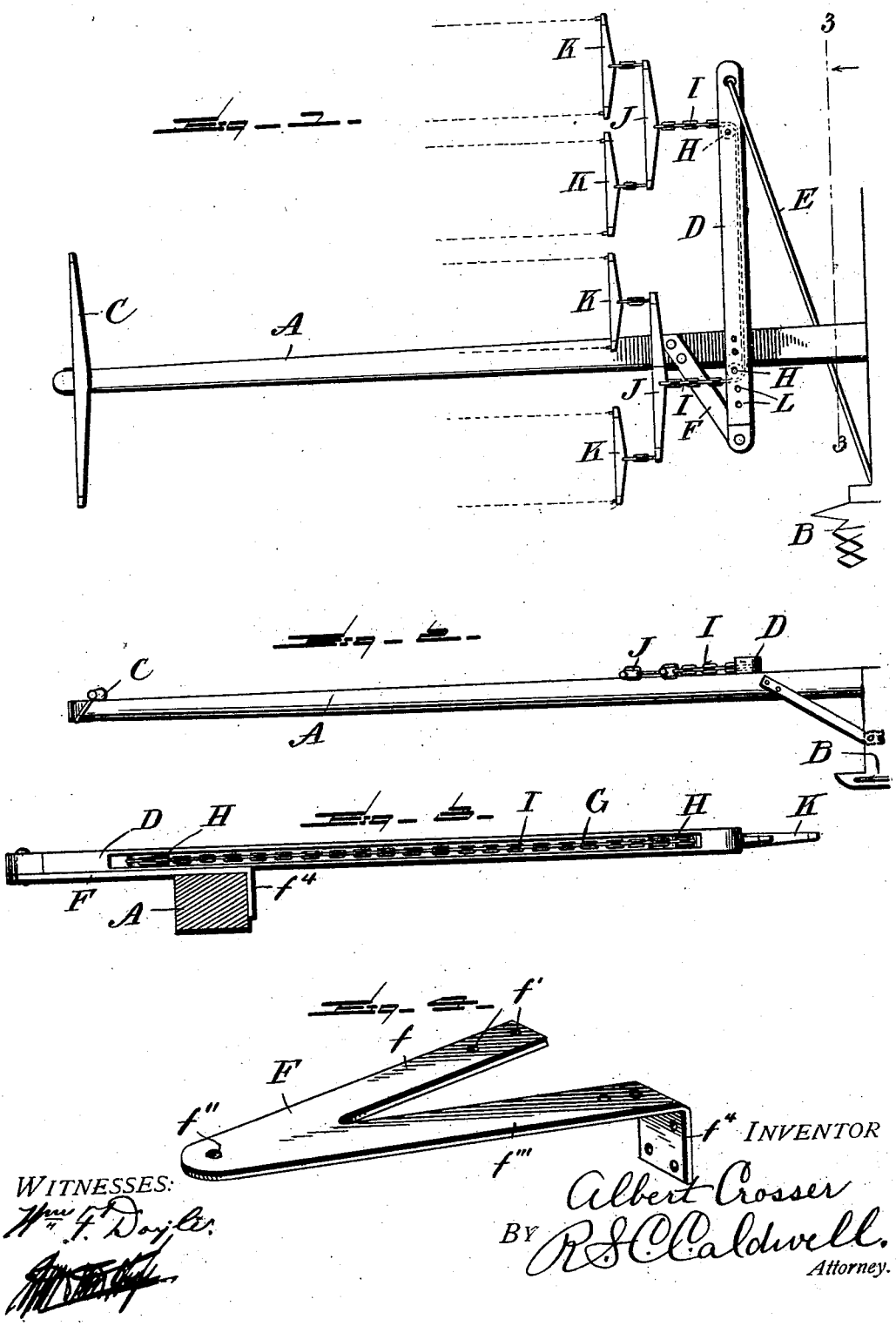

ALBERT CROSSER, OF HARTLEY, IOWA.

FOUR-HORSE EVENER.

SPECIFICATION forming part of Letters Patent No. 692,987, dated February 11, 1902.

Application filed July 23, 1901. Serial No. 69,437. (No model.)

*To all whom it may concern:*

Be it known that I, ALBERT CROSSER, a citizen of the United States, residing at Hartley, in the county of O'Brien and State of Iowa, have invented certain new and useful Improvements in Four-Horse Eveners; and I do hereby declare the following to be a full, clear, and exact description of the invention, such as will enable others skilled in the art to which it appertains to make and use the same.

My invention relates to certain new and useful improvements in draft-equalizers, and particularly to that class known as "four-horse eveners."

This invention has for its object to overcome the side draft common to all agricultural implements to which the horses are attached unevenly—that is to say, the draft-horses are so disposed with relation to the draft-rod that more horses are located on one side thereof than on the other side. Ordinarily this arrangement of the horses gives the machine the tendency to deviate from a straight course by reason of the unequal draft on the opposite sides of the draft-bar, and it is to obviate this undesirable feature that my invention is designed. I attain this object by rigidly mounting a cross-bar near the end of the draft-bar in such a position as to stand at right angles to the draft-bar, with its greater part on one side thereof, where it is securely held in position by braces. Traveling through a channel of the cross-bar and mounted on suitable pulleys therein is a chain, to each end of which is a doubletree carrying a pair of singletrees, the singletrees of one pair being located on opposite sides of the draft-bar, so that in all there are three singletrees on one side of the draft-bar and only one on the other side thereof. By this arrangement the draft of each pair of horses is equalized by the draft of the other pair instead of there being three times the amount of draft on one side of the draft-bar as there is on the other. It obviously follows that by thus opposing the draft of two horses to the draft of another two horses the tendency of the machine to creep to one side or side draft common to machines without my improvement is obviated.

With the above and other objects in view my invention further consists in the novel details of construction and combination of elements, to be clearly described in the following specification and fully set forth in the claims.

Referring to the accompanying drawings, forming a part of this application, and in which like characters of reference indicate similar parts throughout the several views, Figure 1 is a plan view of my improved four-horse evener as applied to a mowing-machine, of which a mere fragment is here shown. Fig. 2 is a side elevation thereof. Fig. 3 is a front elevation of the cross-bar with the draft-bar in section and taken on the line 3 3 of Fig. 1, and Fig. 4 is a perspective view of the brace.

In the drawings, A represents a draft-bar of ordinary construction connected at its rear end to a mowing-machine B in the usual manner and having at its forward end a neck-yoke C.

To the rear end of the draft-bar A, in front of machine B, is rigidly attached a cross-bar D at a point about three-fourths of its length and securely held in position, which is at right angles to the draft-bar, by a brace-rod E, extending from the long end of the cross-bar D rearward across the draft-bar to the machine proper, and a brace F, connected to the short end of the cross-bar D and extending forward and connected to the draft-bar A. In detail the brace F consists of a plate of sheet metal comprising a straight arm $f$, with its end located between the draft-bar A and cross-bar D and provided with apertures $f'$ to receive the connecting-bolts joining said draft-bar and cross-bar. The other end of arm $f$ is apertured at $f''$ to receive a bolt in the short end of the cross-bar D, and at this end there merges with the arm $f$ a second arm $f'''$, which lies in the same plane with, but at an acute angle to, the arm $f''$ and has its extremity $f^4$ bent downward at right angles to engage the far side of the draft-bar A, to which it is bolted, as is also this end of arm $f'''$.

Along the front edge of the cross-bar D is a channel G, in each end of which is journaled a pulley H, around which and through the channel extends a chain I, having attached at each end a doubletree J, carrying pairs of singletrees K, the pair of singletrees at the short end of the cross-bar being located on opposite sides of the draft-bar, so that there will be three horses located on one side of said draft-bar and one horse on the other side thereof. As some machines have greater side draft than others, I prefer to provide the short end of the cross-bar D with a number of perforations L, so that the pulley at this end may be adjusted to vary its distance from the draft-bar and so compensate for such differences.

From the above description it will be seen that I effectually overcome all side draft in machines of this order and provide a very simple and substantial construction which will be easy to manufacture and strong and durable in use.

Having fully described my invention, what I claim as new, and desire to secure by Letters Patent, is as follows:

1. In a device of the character described, a draft-bar, a cross-bar rigidly secured thereto, with a greater length on one side of the draft-bar than on the other, a brace-rod connecting the long end of the cross-bar with the machine, a brace connecting the short end of the cross-bar with the draft-bar, a channel in the front edge of the draft-bar, a pulley mounted in each end thereof, a chain extending around the pulleys and through the channel, and means on the end of the chain to which horses may be attached, substantially as described.

2. In a device of the character described, a draft-bar, a cross-bar rigidly secured thereto with a greater length on one side of the draft-bar than on the other, a brace-rod extending from the long end of cross-bar rearward beneath the draft-bar and connected to the machine, an angular brace extending from short end of the cross-bar forward to the draft-bar with its end bent thereover and secured thereto, a channel in the front edge of the cross-bar, a pulley mounted in each end thereof, the pulley at the short end of the cross-bar being adjustable with relation to the draft-bar, a chain extending around the pulleys and through the channel and means on the ends of the chain to which horses may be attached, substantially as described.

In testimony whereof I affix my signature in presence of two witnesses.

ALBERT CROSSER.

Witnesses:
J. M. EBRIGHT,
L. A. MILLER.